(12) United States Patent
Matsuo

(10) Patent No.: US 8,165,042 B2
(45) Date of Patent: Apr. 24, 2012

(54) NETWORK COMMUNICATION APPARATUS, METHOD AND PROGRAM

(75) Inventor: Takayuki Matsuo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 91 days.

(21) Appl. No.: 12/864,860

(22) PCT Filed: Apr. 28, 2010

(86) PCT No.: PCT/JP2010/057921
§ 371 (c)(1),
(2), (4) Date: Jul. 27, 2010

(87) PCT Pub. No.: WO2010/131633
PCT Pub. Date: Nov. 18, 2010

(65) Prior Publication Data
US 2011/0064076 A1    Mar. 17, 2011

(30) Foreign Application Priority Data
May 13, 2009    (JP) ................................. 2009-117049

(51) Int. Cl.
*H04L 12/28* (2006.01)
*H04L 12/56* (2006.01)

(52) U.S. Cl. ... 370/255; 370/389; 370/392; 370/395.54; 709/245

(58) Field of Classification Search ................. 370/389, 370/392, 255, 395.32, 395.54, 254; 709/245
See application file for complete search history.

(56) References Cited

U.S. PATENT DOCUMENTS

| 7,134,012 B2* | 11/2006 | Doyle et al. ................... 713/151 |
| 7,266,090 B2* | 9/2007 | Sawada et al. ................. 370/254 |
| 7,596,693 B1* | 9/2009 | Caves et al. ................... 713/161 |
| 7,609,690 B2* | 10/2009 | Ogata .............................. 370/389 |
| 7,869,389 B2* | 1/2011 | Kang ............................... 370/278 |
| 2006/0224774 A1* | 10/2006 | Tanji .............................. 709/245 |
| 2007/0011326 A1 | 1/2007 | Ohara |
| 2007/0047549 A1* | 3/2007 | Park ............................... 370/392 |
| 2008/0250123 A1* | 10/2008 | Chae et al. ..................... 709/220 |
| 2009/0175276 A1* | 7/2009 | Tsuge et al. ................... 370/392 |
| 2010/0080227 A1* | 4/2010 | Kang ............................. 370/392 |

FOREIGN PATENT DOCUMENTS

| EP | 1 453 279 | 1/2004 |
| JP | 11-110365 | 4/1999 |
| JP | 2002-252641 | 9/2002 |
| JP | 2002-354005 | 12/2002 |
| JP | 2006-324946 | 11/2006 |
| JP | 2007-019612 | 1/2007 |

OTHER PUBLICATIONS

International Search Report and Written Opinion of the International Searching Authority, issued Aug. 10, 2010 in International application No. PCT/JP2010/057921.

* cited by examiner

*Primary Examiner* — Kwang B Yao
*Assistant Examiner* — Candal Elpenord
(74) *Attorney, Agent, or Firm* — Fitzpatrick, Cella, Harper & Scinto

(57) ABSTRACT

The present invention filters packets and reduces traffic when communication is performed with a device on a network utilizing the IPv6 protocol. To achieve this, a printer driver operating in a personal computer correlates and stores the name of the communicating party and an address for which communication actually succeeded from among addresses that have undergone name resolution, and uses the stored address in communicating with the same communicating party from then onward.

25 Claims, 7 Drawing Sheets

NETWORK COMMUNICATION APPARATUS, METHOD AND PROGRAM

This application is a National Stage application under 35 U.S.C. §371 of International Application No. PCT/JP2010/057921, filed on Apr. 28, 2010, which claims priority to Japanese Application No. 2009-117049, filed on May 13, 2009, the contents of each of the foregoing applications being incorporated by reference herein.

TECHNICAL FIELD

The present invention relates to a communication function that operates in a personal computer, for example, for communicating with a device on a network. In particular, the invention relates to a communication function that utilizes IPv6 (Internet Protocol Version 6) as the communication protocol.

BACKGROUND ART

In response to the ongoing exhaustion of addresses available with the current Internet protocol (IPv4), IPv6 has started to come into practical use as a next-generation Internet protocol improved to enlarge address space, provide additional security and transmit data in accordance with priority. The specifications of the IPv6 protocol are such that a plurality of addresses are can be allocated to a single network interface. For example, a link local unicast address (referred to as a "link local address" below) and a global unicast address (referred to as a "global address" below) are known as addresses that can be allocated. Furthermore, since a plurality of addresses can be allocated as global addresses, there are cases where an IPv4 address and a plurality of IPv6 addresses are registered with respect to a single host in a DNS (Domain Name System) server.

An FQDN (Fully Qualified Domain Name) usually referred to as a "name" is in use in order to identify a communicating party. It should be noted that an FQDN is a host name or domain name indicated from a root along the hierarchical structure of a DNS domain. An FQDN will be referred to simply as a "name" below. When a DNS server is queried about a binary address by designating a name, there are instances where a plurality of IPv6 addresses are acquired. It is not necessarily possible for all of these addresses to be reached from the personal computer that was the source of the inquiry. In TCP communication using IPv6, an attempt is made sequentially to connect to a plurality of addresses obtained as the result of name resolution using the DNS and the address prevailing at the moment a connection succeeds is used as the party's address. With UDP (User Datagram Protocol) communication using IPv6, an application must verify reachability by using a method such as packet resend with respect to a communicating party. Accordingly, in essentially the same way as TCP communication, an attempt must be made to transmit a packet to a plurality of addresses in sequential fashion. Thus, IPv6 communication invites an increase in network traffic and trial time until a connection is established, these essentially being attendant upon the fact that a plurality of addresses are used.

Similarly, a plurality of addresses exist also as local addresses opposite an address of a communicating party. When the address of a communicating party is decided, the local address corresponding to this address is selected in accordance with an algorithm defined as RFC 3484 ["Default Address Selection for Internet Protocol version 6 (IPv6)"]. Since this address selection algorithm is executed within a program, usually referred to as a "protocol stack", which is nearly an operating system, an application program cannot participate in relation to the local address selected.

Owing to the fact that a plurality of IPv6 addresses exist for each of two communication end points, the situation described below arises in a case where communication using the UDP protocol in particular is carried out. Assume that communication end points A and B each have three of their own IPv6 addresses and that these are Addr_A1, Addr_A2, Addr_A3 and Addr_B1, Addr_B2, Addr_B3, respectively. Assume that among the addresses possessed by communication end point B, the two addresses Addr_B1 and Addr_B2 have been registered with the DNS.

In a case where communication end point A starts communicating with communication end point B, as illustrated in FIG. 3A, first communication end point A designates the name of communication end point B (here the name will be "communication end point B") and requests (queries) the DNS server for name resolution. The DNS server sends back (responds with) the two addresses (Addr_B1 and Addr_B2) as the result of name resolution.

The communication end point A that has received the result of name resolution transmits a request to Addr_B1 and reaches the communication end point B. The communication end point B sends back a response corresponding to the request. At this time, however, the communication end point has ascertained that Addr_A1 is the address at the source of transmission of the request and therefore it sends back its response to this address. When this is done, the address selection algorithm defined in RFC 3484 mentioned above functions and there are instances where Addr_B3 rather than Addr_B1 is selected as the optimum address from among the three addresses possessed by communication end point B. Thus, the response from communication end point B is sent from Addr_B3 to Addr_A1 of communication end point A. Thus a situation arises in which, from the standpoint of communication end point A, data is sent to it from an unknown address.

There are instances where, if it has been confirmed that the party to which the communication end point A sent the request is only the communication end point B, then the data from the unknown address can be determined to be a response sent from communication end point B. However, it will be understood that this determination is not possible if consideration is given to a case where, as shown in FIG. 3B, communication end point A sends requests to the two parties at communication end points B and C substantially simultaneously. Assume that the addresses of communication end points A, B and C in FIG. 3B are Addr_A1, Addr_A2, Addr_A3; Addr_B1, Addr_B2, Addr_B3; and Addr_C1, Addr_C2, Addr_C3, respectively. Furthermore, assume that those addresses among the addresses of communication end point B that have been registered with the DNS server are Addr_B1 and Addr_B2, and that such addresses of the communication end point C are Addr_C1 and Addr_C2. Assume also that the communication end point A queries the DNS server regarding the names of the communication end points B and C and that it receives two addresses per end point as responses. Here the communication end point A sends requests to the communication end points B and C, the communication end point B sends a response from Addr_B3 to Addr_A1, and the communication end point C sends a response from Addr_C3 to Addr_A1.

The communication end point A thus receives data from the unknown addresses Addr_B3 and Addr_C3. The communication end point A cannot determine from which of the communication end points B and C these two items of data have been received as response data. In the case of a protocol such as IPv4 in which a response can always be expected to be sent back from the address at the transmission destination of the request, such a problem cannot arise because the communicating party can be identified by a set of addresses that include the port numbers of both communication end points. In the event that the address at the source of transmission of a response packet does not match the address at the transmission destination of a request packet under these circumstances, a security-related problem arises, namely that address-based packet filtering for refusing acceptance is no longer carried out.

Specifically, since there is the possibility that a data packet that has been sent from an unknown address will be an authorized response to a request packet, it is not filtered and cannot be discarded. This means that any packet whatsoever must be received.

With the aim of improving upon the increase in traffic and processing delay that accompany name resolution in an DNS server, there is a method of deciding, based upon past performance, which protocol should be used to access a server in which IPv4 and IPv6 addresses have been registered (see the specification of Japanese Patent Laid-Open No. 2007-19612). The prior art disclosed in Japanese Patent Laid-Open No. 2007-19612 mainly assumes a situation in which IPv4 and IPv6 are mixed. It correlates and caches an IP protocol, with which it was possible in the past to communicate with a server process attempting to be accessed, with the server process and attempts to utilize this IP protocol and the corresponding address the next time access is made. This prior art is effective in reducing access to a DNS server and in reducing needless address access tries in a case where the server process does not wait for all protocol addresses that have been registered in the DNS server.

However, in a situation in which a response from a server process is sent from an unknown address, caching itself is not carried out and the problems set forth below cannot be solved even with the invention disclosed in Japanese Patent Laid-Open No. 2007-19612.

1. Basically, response data from an address other than an address selected as a transmission destination must be received. That is, there is a problem in terms of security, namely that address-based packet filtering must be removed.
2. With an application that performs communication using addresses of both the IPv4 and IPv6 protocols, the number of times the DNS server is queried regarding name resolution increases. This increases traffic and delays response time.
3. In a case where a plurality of IPv6 addresses for a single communication end point have been registered with a DNS server, there is the possibility that packet transmission will be performed using all of the plurality of addresses. In other words, traffic increases.

SUMMARY OF INVENTION

The present invention solves the problems set forth above. To achieve this, the present invention provides a data communication apparatus for communicating, via a network, with a network device that can be assigned a plurality of addresses per one name, comprising: acquisition means for acquiring an address corresponding to a name of a transmission destination; transmission means for transmitting this transmission data, together with identification information that identifies this transmission data, to the acquired address; reception means for receiving response data having identification information corresponding to transmission data; determination means for determining, based upon the identification information, whether the received response data is a response to the transmission data; and response processing means for discarding the response data if it has been determined that the response data is not a response to the transmission data, and delivering data contained in the response data to a source requesting the data transmission if it has been determined that the response data is a response to the transmission data.

An effect provided by the present invention is that an application solves the problems mentioned above. Specifically, the security-related problem, namely that address-based packet filtering must be removed, can be solved. Further, an increase in traffic and a delay in response time can be prevented even with an application that performs communication using addresses of both the IPv4 and IPv6 protocols. An increase in traffic can be suppressed even in a case where a plurality of IPv6 addresses for a single communication end point have been registered in a DNS server.

Further features of the present invention will become apparent from the following description of exemplary embodiments with reference to the attached drawings.

DESCRIPTION OF EMBODIMENTS

Figure 2:
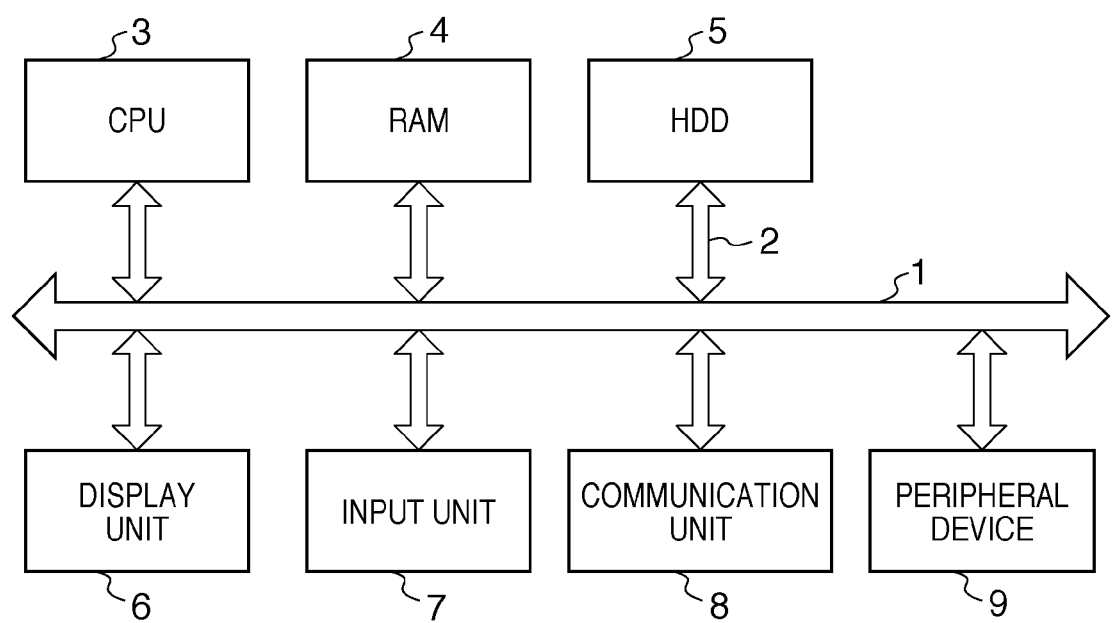
FIG. 2 is a block diagram illustrating the configuration of a personal computer according to the embodiment.
Figure 3A:
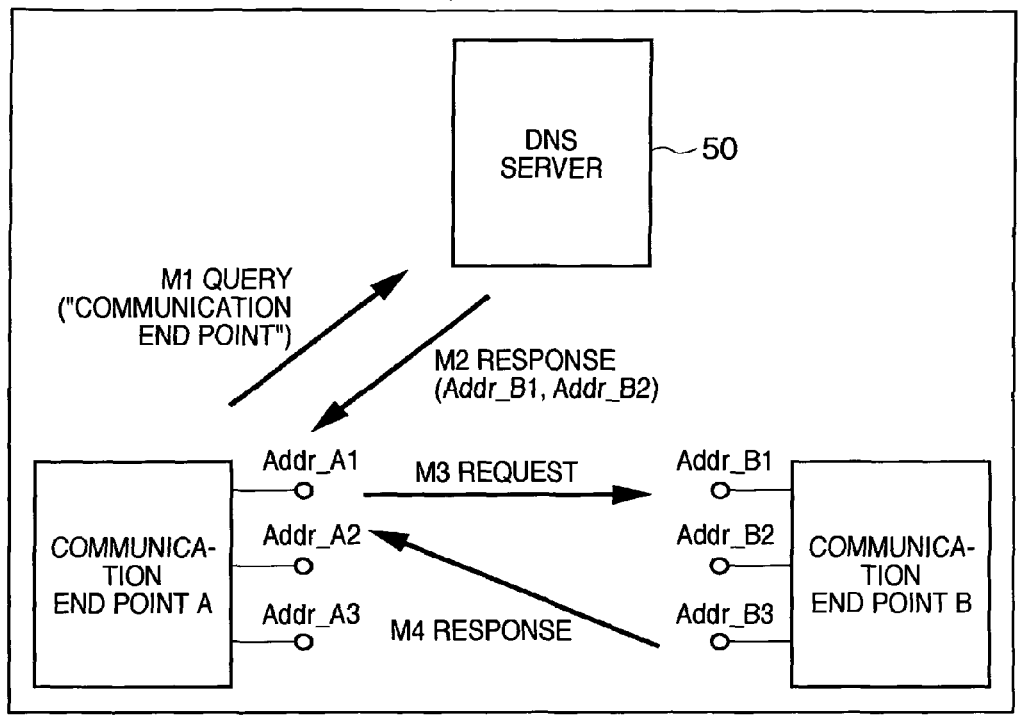
FIG. 3A is a diagram illustrating the relationship between communication end points and a DNS server that handle IPv6 addresses.
Figure 3B:
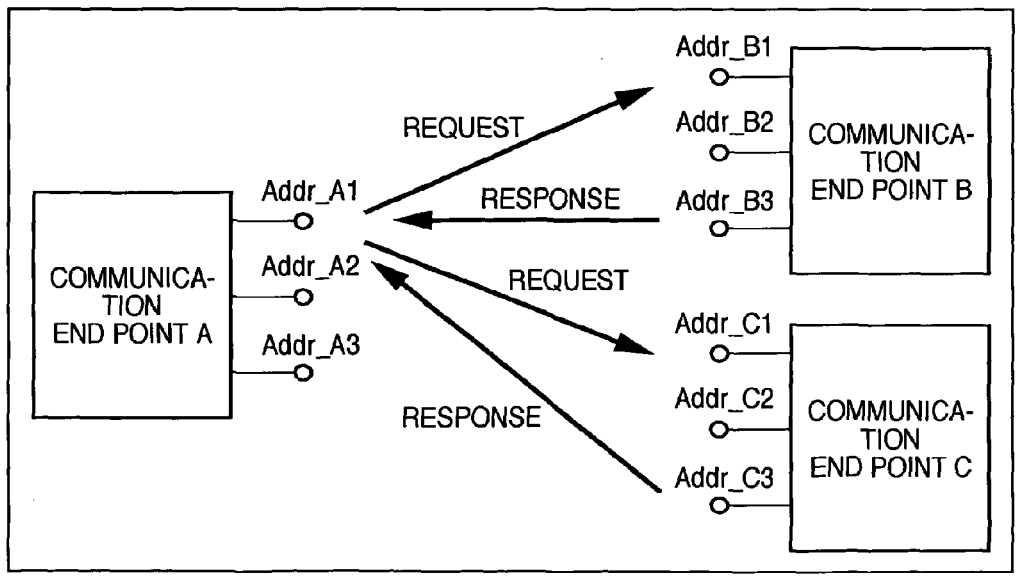
FIG. 3B is a diagram illustrating the relationship among addresses used among a plurality of communication end points that handle IPv6 addresses.

FIG. 2 is a block diagram illustrating the configuration of a personal computer serving as a data communication apparatus that operates upon loading an application program when the present invention is applied to a printer driver. The personal computer in which this printer driver has been installed functions as a printing control apparatus for controlling a printer. The operating system of the personal computer is executed by a CPU 3 upon being stored in storage means which may be any of a RAM 4, hard-disk drive 5 or storage medium in a disk drive, described later. The operating system presents a display on a display unit 6 in response to a request from the printer driver, accepts user inputs from an input unit 7 and informs the printer driver of these inputs. The operating system controls a communication unit 8, controls a peripheral device 9 in addition to peripherals connected by the communication unit 8, inputs and outputs signals to and from the peripheral device and inputs and outputs signals to and from the printer driver. Examples of peripheral devices that can be controlled are a PC card, various disk drives, a printer and a network card, etc. The operating system further provides a file system function. The file storage medium is not limited to the hard-disk drive 5 and RAM 4 in FIG. 2 but also encompasses an external storage device inclusive of another personal computer on a network connected via the communication unit 8. The operating system and printer driver deliver and receive data to and from a group of hardware modules interconnected through system buses 1, 2 of the personal computer.

The printer driver accesses resources of the personal computer through an application program interface (API) provided by the operating system, and uses the functions provided by the operating system. The printer driver, which is loaded in the application program, is delivered print data and translates the print data into a language that can be understood by the printer. This is the main processing performed by the printer driver. In addition, the printer driver provides a function for acquiring and displaying for the user the status of such devices as a stapling unit, stacker unit and paper tray with which the printer is equipped. The printer driver further provides a function for acquiring and displaying a list of jobs that have accumulated within the printer and that await printing.

The printer driver is executed by the CPU 3 upon being stored in storage means which may be any of a RAM 4, hard-disk drive 5 or storage medium in a disk drive, described later. Further, the printer driver refers to files that have been stored in the file system provided by the operating system. In the description below regarding the configuration and operation of the printer driver, a detailed description of the function relating to the translation of print data will be excluded. The printer driver according to this embodiment assumes that a device such as network printer or copier is the network device of a communicating party designated by the user. A device such as a network printer or copier will be referred to generically as a "printer" below. Described in detail below is a function for accessing the printer via a network, acquiring the model name of the printer, a list of functions with which the printer is equipped and a list of print jobs within the printer, and displaying this information on the display unit 6 shown in FIG. 2.

Figure 1:
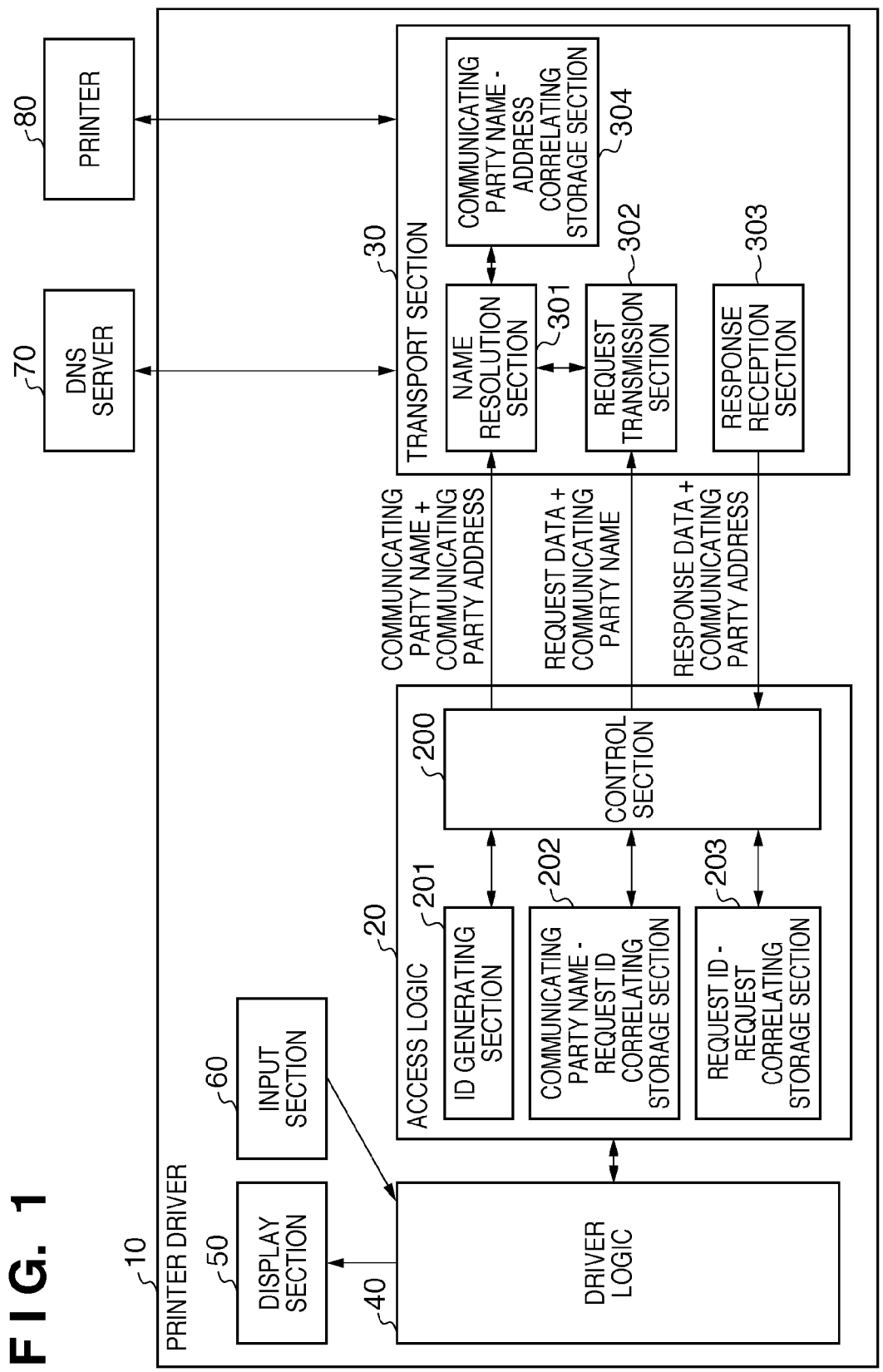
FIG. 1 is a block diagram of a printer driver according to an embodiment of the present invention.

FIG. 1 is a block diagram illustrating the configuration of the printer driver 10 according to the present invention. The printer driver 10 translates data, which has been created by an application program or the like, into a printer description language capable of being interpreted and executed by a user-designated printer, and transmits the translated data to this printer. Although the data transmitted is generally referred to as transmission data, the term "print data" will be used with regard to the above-mentioned translated data sent to the printer. The printer driver 10 includes a display section 50, an input section 60, access logic 20, a transport section 30 and driver logic 40. Three functional blocks that reside within the printer driver 10 will be defined first.

The driver logic 40 is a functional block for designating the name of the printer to the access logic 20 and instructing the access logic to acquire information. The driver logic 40 executes processing for translating the print data in the printer driver 10 and displays a screen on the display unit of the personal computer. The driver logic 40 further controls printer selection means by which the user selects a printer and specifying means for acquiring the functions of the printer selected, and causes information acquired from the printer to be displayed on a screen. Furthermore, the driver logic 40 executes processing for designating the name of the printer to the access logic 20, described below, requesting acquisition of desired information and acquiring the result.

The access logic 20 is a block which executes processing for creating request data based upon transmission data, designating the transmission destination of a request designated by a domain name or host name (namely an FQDN), and requesting the transport section 30 to perform request transmission. Although the request transmission destination can be designated not only by an FQDN but in the form of an IPv4 or IPv6 (Internet Protocol version 6) binary address or computer name or the like, the access logic 20 designates at least an FQDN.

The transport section 30 is a functional block for sending the requested request data to the requested transmission destination, receiving the response to this request and delivering the response to the access logic 20. Assume that the transport section 30 possesses no knowledge whatsoever relating to the content of the request whose transmission has been requested and the content of the response. Furthermore, the transport section 30 queries the DNS server for the purpose of specifying the binary address of the transmission destination designated by the FQDN.

The printer driver 10 accesses the DNS server that exists on the network. The printer driver 10 designates to the DNS server the FQDN of the printer that is the target of communication of the printer driver and receives as the response the address that has been allocated to this printer.

The input section 60 receives the user input via the input unit 7 of FIG. 2 and delivers the input to the driver logic 40. The FQDN of the printer that is the communicating party and an address acquisition-start command are delivered as the input information. The display section 50 executes processing for creating data to be displayed and for displaying this data on the display unit 6 of FIG. 2. The displayed content includes information acquired from the printer, namely the model name of the printer, the list of equipped functions and the list of print jobs within the printer.

The driver logic 40 delivers to the access logic 20 the FQDN of the printer and the instruction to start address acquisition, these being delivered from the input section 60.

The access logic 20 includes a request ID generating section 201, a storage section 202 storing the relationship between a communicating party name and request ID, a storage section 203 storing the relationship between a request ID and a request, and a control section 200. When the address acquisition-start instruction is applied, the control section 200 sends the request ID generating section 201 a request to generate a request ID. In response to the request from the control section 200, the request ID generating section 201 generates a unique ID and sends back the ID. The request ID uses an ID that cycles at a comparatively long period. As a result, the possibility that a request ID identical with the request ID generated when a transmission is made to a certain printer will be used at the same time as a separate request to the same apparatus or as a request to another printer is very small. Conversely, a period long enough so that the identical request IDs will not be used in the same system is selected as the period of the request ID. There is the possibility that a single request ID will be used over a maximum length of time equivalent to [number of addresses registered in a DNS with regard to the host name (the printer in this example) of the transmission destination]×(response waiting time)+(wake-up time from sleep)+(time required for response). If this length of time is adopted as the maximum ID utilization time, then the uniqueness of the request ID will be maintained provided that the relation (period of request ID)>(maximum ID utilization time)/(average time interval at which transmission request is generated) is satisfied.

The control section 200 delivers the FQDN of the communicating party and the request ID to the storage section 202, which stores these in correlation with each other. The storage section 202 also has a function which, when a request ID is designated, searches for the correlated FQDN and sends back the FQDN found. The control section 200 delivers the request ID and request data to the storage section 203, which stores these in correlation with each other. The storage section 203 also has a function which, when a request ID is designated, searches for the correlated request data and sends back the request data found.

The control section 200, which controls the ID generating section 201, storage section 202, storage section 203 and transport section 30, acquires the necessary information from the printer of the communicating party.

The control section 200 is not concerned with the details of the positions (addresses) of an externally located DNS server 70 and printer 80 in the network. The control section 200 creates protocol data, referred to as request data, decided by agreement with the printer. Embedded in the protocol data is the request ID, which is a unique ID for uniquely identifying the communicating party. The request data, which is the content of the transmission, and the name (FQDN) of the communicating party, which is the transmission destination, are delivered from the control section 200 to the transport section 30 and the latter is requested to perform transmission.

The transport section 30 includes a name resolution section 301, a storage section 304 storing the relationship between the name of a communicating party and an address, a request transmission section 302 and a response reception section 303. The request transmission section 302 accepts request data and the name, i.e., FQDN, of the printer that is the transmission destination, as inputs. The request transmission section 302 then requests the name resolution section 301 to convert the received FQDN to an address. The name resolution section 301 causes the address correlated with the FQDN delivered from the request transmission section 302 to be searched for by the storage section 304. If a related address is found, the name resolution section 301 delivers this address to the request transmission section 302. The storage section 304 essentially functions as the execution portion of the name resolution section 301 for retrieving the address from the FQDN and sending back the address. The request transmission section 302 thus acquires the address (address of the communicating party) corresponding to the FQDN at the transmission destination. The address designated for name resolution can be both an IPv4 address and an IPv6 address. With IPv6, a plurality of addresses can be assigned to a single name (FQDN), as mentioned earlier.

The request transmission section 302 uses the UDP (User Datagram Protocol) to transmit request data requested with respect to the acquired address of the communicating party. In a case where a plurality of addresses have been returned from the name resolution section 301, processing is executed with regard to each address for resending the request data if a response is not received upon elapse of a fixed period of time following the transmission of the request data.

The response reception section 303 provides a function for receiving response data from the printer and delivering the response data to the access logic 20 as response data. The response reception section 303 also acquires the address of the source of the transmission of the response data and delivers this address together with the response data. It should be noted that the printer transmits the response data using UDP. The request is correlated by the request ID contained in a packet.

Figure 7A:
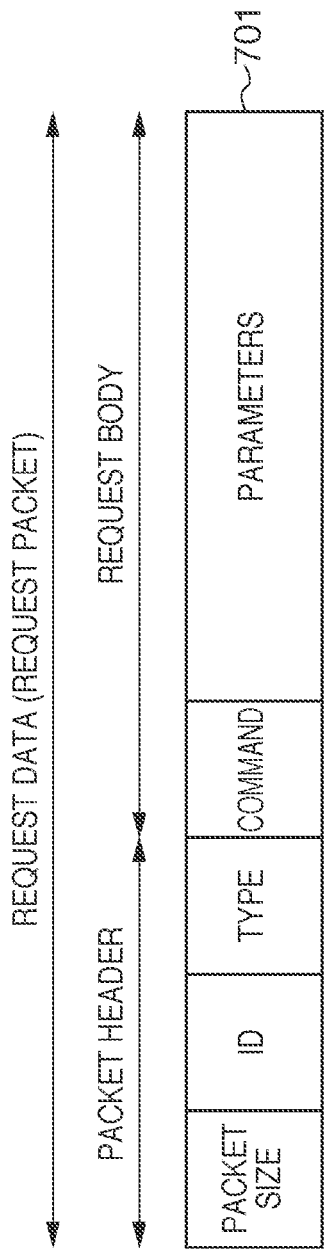
FIG. 7A is a diagram illustrating the structure of request data in the embodiment.
Figure 7B:
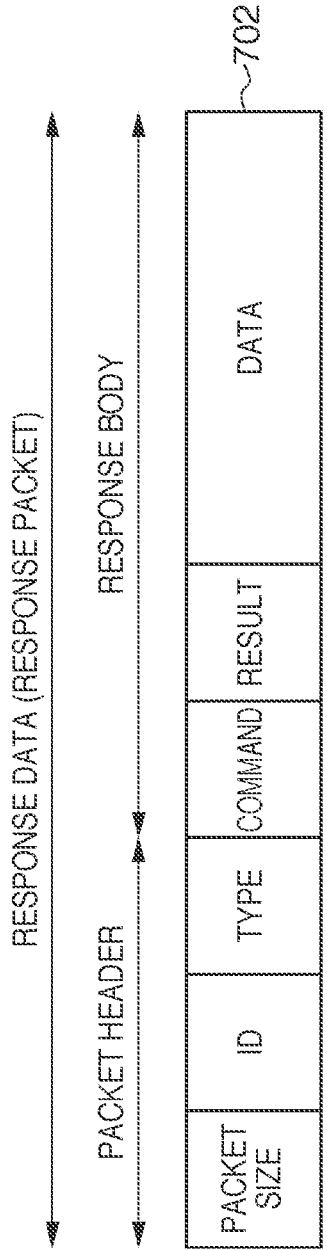
FIG. 7B is a diagram illustrating the structure of response data in the embodiment.

The packet structures of request data 701 and response data 702 exchanged between the printer driver 10 and printer will be described with reference to FIGS. 7A and 7B. FIG. 7A illustrates the request data 701, which is sent from the printer driver 10 to the printer. The request data 701 comprises a fixed-size packet header and a variable-length body. The packet header is the same for the response data 702 with regard to the arrangement of the fields. In the request data 701, however, a numerical value "0" signifying a request is designated in a "TYPE" field, whereas a numerical value "1" signifying a response is designated in the "TYPE" field of the packet header of response data 702. The overall size (number of octets) of the request data 701 or 702 is contained in a "PACKET SIZE" field of the packet header. The request ID, which has been designated on the side that created by request data 701, is also contained in the corresponding response in the "ID" field. That is, the request ID contained in the corresponding request data is written as is in the "ID" field of the packet header of response data 702. The request body has a "COMMAND" field that designates the desired processing content to the receiving side. Requests such as a request for the model name of the apparatus, a request for a list of functions with which the apparatus is equipped, and a request for a list of jobs within the apparatus are defined as the types of processing content designated in the "COMMAND" field. A parameter decided for every command is designated in a "PARAMETER" field of the request body.

On the other hand, the response body has a "COMMAND" field indicating processing content. The content of "COMMAND" contained in the corresponding request data is stored in this field as is. A value signifying the result of execution of processing is contained in a "RESULT" field of the response body. Values signifying result of processing, such as success, illegal parameter or error at execution, have been defined.

Figure 4A:
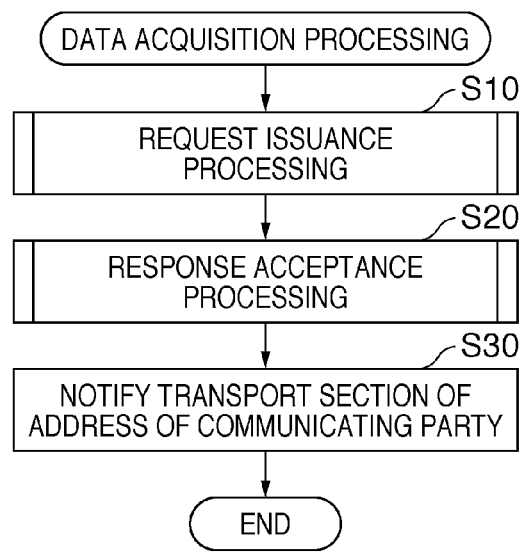
FIG. 4A is a flowchart illustrating data acquisition processing in the embodiment.

Processing executed by the access logic 20 and transport section 30 will be described with reference to the flowcharts shown in FIGS. 4A to 6B. FIG. 4A is a flowchart illustrating processing for acquiring data from a printer. This is the main function of the access logic 20.

At step S10, request issuance processing is executed for designating the printer at the transmission destination and transmitting request data to the designated printer. At step S20, response reception processing is executed for receiving response data from the designated printer together with the address of the communicating party. At step S30, the FQDN, which is the transmission destination (communicating party) name designated together with the request data, and the address (IP address, for example) received together with the response data are delivered to the transport section 30. As a result, the transport section 30 is caused to correlate the name (FQDN) of the communicating party and the address.

Figure 4B:
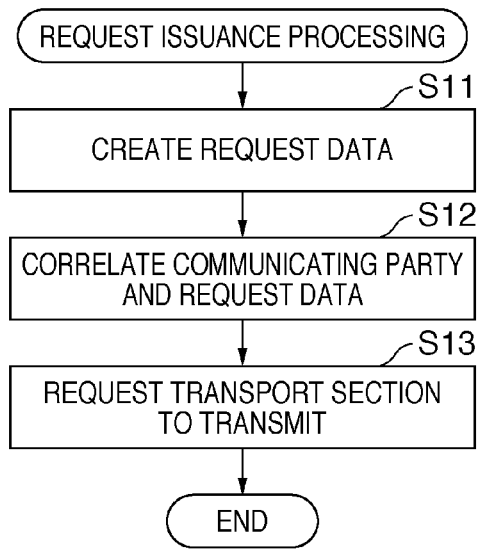
FIG. 4B is a flowchart illustrating request issuance processing in the embodiment.

The data acquisition processing of step S10 comprises the processing of steps S11 to S13, as shown in FIG. 4B. Step S11 is a request data creation step of creating request data transmitted to the printer. Specifically, the processing of step S11 creates request data by embedding a request ID in a request packet. The request ID was generated in the ID generating section 201 and is a unique request ID at least at this point in time.

Step S12 is a correlation step of correlating the communicating party and the request data. Here the communicating party is the name (FQDN) of the printer, and the content of the request data is copied to and stored in the storage section 203 of FIG. 1 until a response is received. At step S12, the request packet is correlated with the request ID and stored in the storage section 203.

At step S13, the created request data 701 is delivered to the transport section 30 along with the name (FQDN) of the printer, which is the communicating party, and the transport section 30 is requested to transmit this information. At the same time that transmission is requested, the name of the printer and the request ID are correlated and stored in the storage section 202.

It should be noted that the request data includes the request ID per se. This means that the name of the communicating party and the request packet may be correlated and stored at step S13 without storing the request ID and request packet at step S12, by way of example. Request data having a specific request ID can be retrieved even if this arrangement is adopted.

Figure 4C:
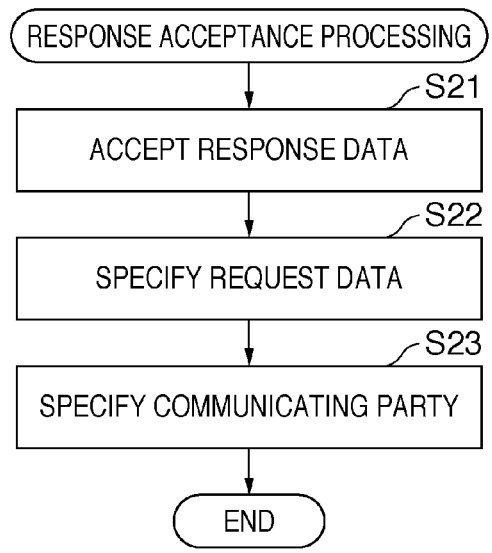
FIG. 4C is a flowchart illustrating response acceptance processing in the embodiment.

Next, the response reception processing at step S20 in FIG. 4A, namely response processing, will be described. FIG. 4C is a flowchart showing the details of the response acceptance processing. The response acceptance processing comprises the processing of steps S21 to S23. Step S21 is a step of receiving the response data 702 from the transport section 30. The access logic 20 periodically queries the transport section 30 regarding arrival of the response data and accepts the response data if it is received. If the data has not yet been received, the access logic 20 queries, at regular intervals, the transport section 30 about data arrival.

If data could be received, the address (IP address) of the source from which the received data was transmitted is acquired simultaneously. This is information that the transport section 30 can acquire from the protocol stack included with the operating system, although this will be described later. Control then proceeds to step S22.

At step S22, the request ID is extracted from the packet header of the response data 702. By using the extracted request ID as a key, the storage section 203 of FIG. 1 is queried and the request data correlated with the request ID is acquired. That is, the request ID of the response packet and the request IDs of requests transmitted in the past are compared. This processing is processing for determining whether the response data 702 from the printer is an authorized response to the request data 701 sent from the printer driver 10. The fact that request data having a request ID contained in response data has been stored is corroboration that this response data has been sent back from the correct transmitting party. That is, it can be determined that the response data having the request ID of the transmitted request data has a high probability of being an authorized response. Since the request and response are correlated by a comparison of information, usually it is difficult to completely prevent a fake or erroneous response. For this reason, that a response is an authorized response is determined using the degree of probability. This is just as carried out in similar fashion in an ordinary request/response sequence. On the other hand, response data not having the request ID of the transmitted request data can be determined to be a response that is not an authorized response.

If it is determined that a response is not an authorized response, then the response data is discarded without any further analysis of content being performed. By virtue of this processing, a filtering function can be implemented for detecting and discarding, to a certain extent, a bogus packet from a malicious third party on the network. Next, the content of the response data is analyzed and delivered to the display section 50. The display section 50 creates display data and presents this display on the display unit 6 of FIG. 2.

Step S23 is a step of searching for the name of the communicating party based upon the request ID. The request ID acquired at step S22 is designated and the name (FQDN) of the communicating party that has been correlated with the designated request ID is sent back to the storage section 202. The FQDN obtained and the address of the source of the transmission of the response data acquired at step S21 are sent back to the source of the call and response acceptance processing is then terminated.

At step S30, the FQDN of the printer acquired at step S20 and the address of the same printer are input and the function for correlating the name and address performed by the name resolution section 301 of the transport section 30 is called. The name resolution section 301 executes the processing of FIG. 6B. This will be described later. Thereafter, the request data corresponding to the authorized response received and the corresponding request ID are deleted from the storage section 203. Further, with regard to a request for which a correct response could not be received, the corresponding request data and the corresponding request ID are similarly deleted from the storage section 203.

Figure 5:
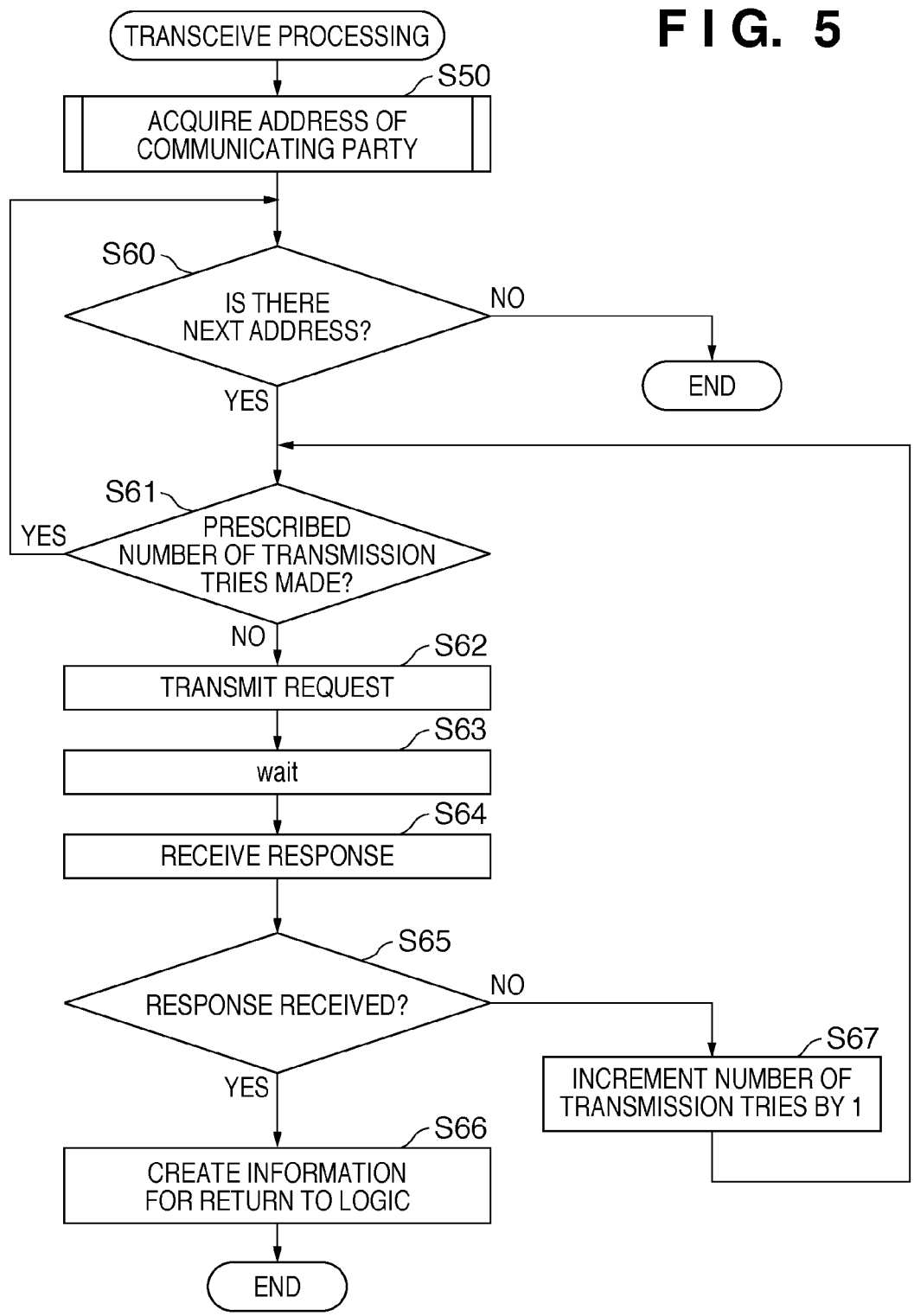
FIG. 5 is a flowchart illustrating transceive processing in the embodiment.
Figure 6A:
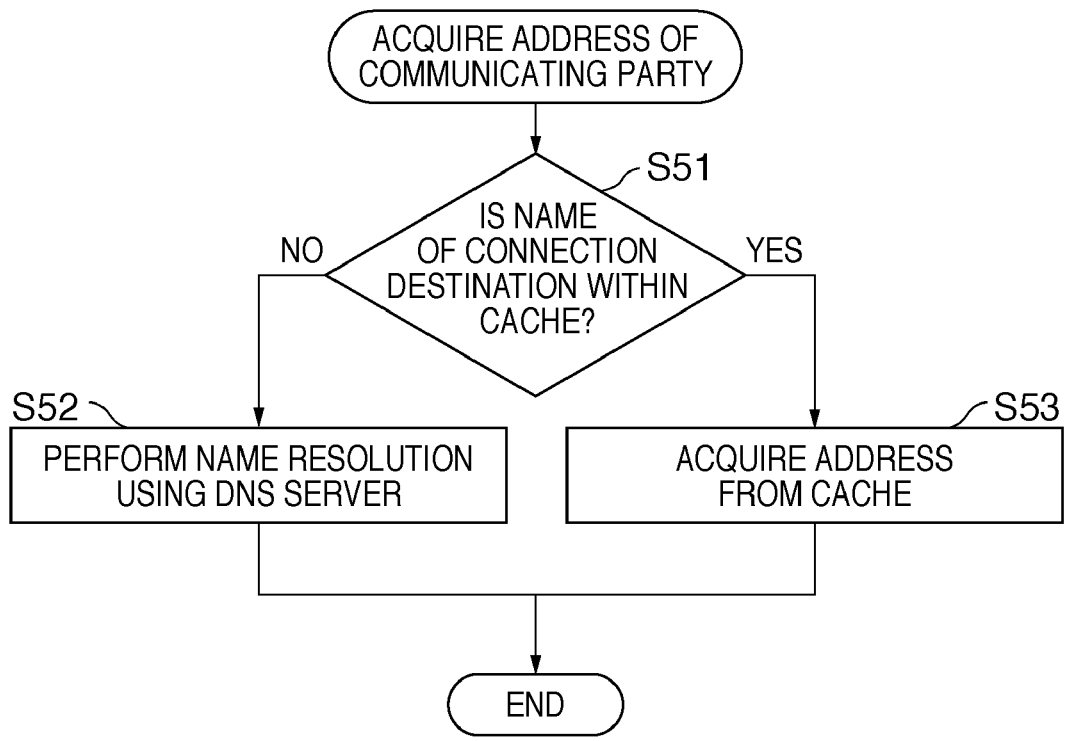
FIG. 6A is a flowchart illustrating communicating-party address acquisition processing in the embodiment.
Figure 6B:
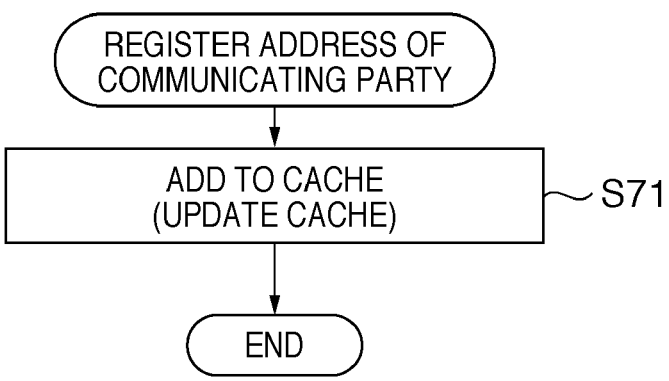
FIG. 6B is a flowchart illustrating communicating-party address registration processing in the embodiment.

FIG. 5 and FIGS. 6A, 6B are flowcharts illustrating processing executed by the transport section 30. The transmit processing of FIG. 5 is processing executed by the transport section 30 as a result of the transport section 30 being requested to transmit. This was described above as the processing by the access logic 20 at step S13 of FIG. 4B. The transmit processing of FIG. 5 has a step S50 and steps S60 to S67. Processing at step S50 for acquiring the address of the communicating party will be described as the detailed steps shown in FIG. 6A. At step S50, the name of the printer constituting the communicating party is received as an input. In actuality, since it is necessary to convert the name of the communicating party to an address before the request is transmitted, an attempt is made to acquire a valid address by accessing either or both the storage section 304, which stores the correlation between the name of the communicating party and the address, and external DNS server 70. These details will be described with reference to FIG. 6A.

At step S51 in FIG. 6A, it is determined whether the name of the communicating party delivered as the input to the storage section 304 as step S50 has already been registered as a key. If the name has already been registered, then the address that has been correlated with the name of the communicating party is acquired from the storage section 304 and is sent back to the source of the call. The storage section 304 may also be referred to as a "cache". If the name of the communicating party has not been registered, on the other hand, the DNS server 70 is requested to perform name resolution at step S52. When the request is made, resolution is requested for both IPv4 and IPv6 addresses. In a case where a plurality of addresses are obtained, all of these are sent back to the source of the call in the form of a list (address list). In a case where the printer driver 10 accesses a certain printer for the first time, a "NO" decision is rendered at step S51 and the DNS server 70 executes name resolution. It should be noted that the "cache" mentioned at step S53 does not cache the result of name resolution by the DNS server 70 as is. What is held in the cache, namely the storage section 304, is information that has been input by processing for registering a communicating party address shown in FIG. 6B, described later.

After the address of the printer constituting the communicating party is acquired at step S50, processing for request transmission and response reception is executed from step S60 onward in FIG. 5. The transceive processing of FIG. 5 essentially involves transmitting a request packet to the address of the communicating party acquired and then verifying that a response is received following a stipulated response waiting time. In a case where a plurality of packets are acquired, one of them is selected and is transmitted to the selected address. If there is no response within the stipulated period of time, then, while repeating resend a stipulated number of times (two times, for example) with regard to one address, all of the addresses acquired at step S50 are tried. These attempts are aborted when a response cannot be received even though the request has been transmitted to all of the addresses obtained by name resolution.

Transceive processing will now be described step by step. At step S60 in FIG. 5, it is determined whether an address that has not yet been dealt with exists in the address list of communicating parties acquired at step S50. That is, the processing at step S60 includes incrementing an index, which points to an address, from the top of the address list and determining whether an address exists at the point to which the index has been incremented. If there is an address that has not yet been dealt with, then it is determined that there is an address capable of being acquired next. If the tail end of the address list has already been reached, a "NO" decision is rendered at step S60 and processing is exited because processing cannot continue further. There can be two cases when the decision rendered at step S60 the first time is "NO", namely a case where the name of the printer constituting the communicating party has not been registered in the DNS server and a case where a response has not been sent back within the stipulated period of time because the printer power source is off or because the printer is offline, by way of example. In a case where there is a next address, this address is adopted as an address of interest. At this time a counter for counting the number of transmissions is returned to an initial value of, for example, zero. Control then proceeds to step S61. Here it is determined whether the prescribed number of transmission tries has been exceeded for every address. That is, if the count value has exceeded the prescribed number, then control returns to step S60 and an attempt is made to acquire the next address.

If a "NO" decision is rendered at step S61, then processing for transmitting the request data is executed at step S62. Step S61 is processing executed by the request transmission section 302 of the transport section 30. At step S61, the request data acquired from the access logic 20 is transmitted to the address adopted as the object of interest at step S60.

Next, at step S63, the system waits for a response only for the prescribed response waiting time (five seconds, for example). In a case where the printer was in the sleeping state, the response waiting time is stipulated upon adding time needed for wake-up and time needed to respond after wake-up.

At step S64, an attempt is made to receive response data from the printer. Specifically, a reception-data acquisition function provided by the protocol stack included in the operating system is called and whether the data has arrived is verified.

At step S65, it is determined whether reception data has been received by the result of executing step S64. If a "NO" decision is rendered, control proceeds to step S67, the number of transmissions is incremented and control returns to step S61. If a "YES" decision is rendered at step S65, on the other hand, then there is a high likelihood that a response corresponding to the request transmitted from the printer has been received. If a "YES" decision is rendered at step S65, therefore, then it is determined that a response to the request has been received. At step S66, the reception data is created as information for delivery to the access logic 20, which is the source of the transmission request. For example, this information includes the received response data and the address of the printer that transmitted this response data.

Next, the processing of FIG. 6B for registering the address of a communicating party will be described. This processing is processing executed as a result of the access logic 20 calling the name—address correlating function of the name resolution section 301 of transport section 30 at step S30 in FIG. 4A. A set consisting of the FQDN of the printer and the address thereof is applied as an input to the processing of FIG. 6B for registering the address of a communicating party. This FQDN and address are correlated and stored at step S71. The FQDN and the address that have been stored in the storage section 304 are consulted as the cache of the address. It is desirable, therefore, to delete a record (the pair composed of the FQDN and address) of the cache for which non-consultation time has exceeded a fixed period of time. This is because there is a possibility that the address has been updated and because storage capacity is limited. Further, in a case also where a request is transmitted to a cached address and no response is received, it is preferred that this record be deleted. An address that is registered is the transmission-destination address of a request for which a normal response has been returned. In addition, it may also be the address of the source that transmitted a normal response, by way of example.

By virtue of the above-described procedure, the name (FQDN) of the transmission destination and the identification information (request ID) appended to the packet are correlated, thereby enabling the received response to be identified as a response that corresponds to the request transmitted. As a result, filtering processing for discarding responses other than the identified response can be implemented.

Furthermore, IPv4 and IPv6 addresses can be acquired in single-time fashion and it is possible to reduce the number of times name resolution is performed and to shorten the required time.

Further, by caching an address for which communication succeeded in correlation with the name (FQDN) of the transmission destination, the number of times packet transmission is tried can be reduced even in a case where a plurality of addresses have been registered in IPv6 DNS server. Network traffic can be reduced as a result.

Although this embodiment has been described taking as an example a case where a printer driver transmits print data, namely request data, to a printer, it is possible to apply the invention to data transmission in general. That is, the invention involving this embodiment can be applied to another application program or system program rather than to the printer driver 10. In this case the access logic 20 and transport section 30 would function in a manner similar to this embodiment with respect to the alternative application program or system program.

Further, this embodiment has been described in a form in which the access logic 20 and transport section 30 are contained in the printer driver. However, the access logic 20 and transport section 30 may be placed outside the printer driver and may be called by a suitable interface, such as a function calling interface, with the driver logic 40. If such an arrangement is adopted, the access logic 20 and transport section 30 can be utilized by describing the interface with the access logic 20 and transport section 30 in the desired program.

Further, the ID contained in the request packet, namely the transmission data, is a code generated in cyclic fashion. However, any code that uniquely identifies a packet, such as a point in time or a combination of a transmission-source address and point in time, will suffice.

Further, in this embodiment, the fact that a response is a normal response is determined using only an ID as the identification information in a case where request data having a request ID identical with the response data has been stored. However, the contents of data may be compared. For example, fields having values common to a corresponding request and response, such as the commands shown in FIGS. 7A and 7B, may be compared and a response may be determined to be an authorized response if the compared fields match. That is, in this case a response is determined to be an authorized response using the common fields of the request and response in addition to the ID as the identification information.

The present invention can be applied to a system constituted by a plurality of devices (for example, a host computer, interface, reader, printer and the like) or to an apparatus comprising a single device (for example, a copier or facsimile machine or the like).

The process steps of the present invention can also be implemented by having a processing apparatus (a CPU or processor) such as a personal computer execute software (a program) that has been acquired via a network or various storage media.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-117049, filed May 13, 2009, which is hereby incorporated by reference herein in its entirety.

The invention claimed is:

1. A data communication apparatus for communicating, via a network, with a network device that can be assigned a plurality of addresses per one name, comprising:
    an acquisition unit, configured to acquire an address corresponding to a name of a transmission destination;
    a transmission unit, configured to transmit transmission data, together with identification information that identifies the transmission data, to the acquired address;
    a reception unit, configured to receive response data having identification information corresponding to transmission data;
    a determination unit, configured to determine, based upon the identification information of the transmission data transmitted by the transmission unit and the identification information of the response data, whether the received response data is a response to the transmission data transmitted by the transmission unit; and
    a response processing unit, configured to discard the response data if the determination unit determines that the response data is not a response to the transmission data transmitted by the transmission unit, and delivering data contained in the response data to a source requesting the data transmission if the determination unit determines that the response data is a response to the transmission data transmitted by the transmission unit,
    wherein if an address corresponding to the name of the transmission destination is not found, said acquisition unit transmits the name of the transmission destination to a DNS server and, if a plurality of addresses have been assigned to the transmission destination, collectively acquires the plurality of addresses.

2. The apparatus according to claim 1, wherein if the determination unit determines that the response data is a response to the transmission data transmitted by the transmission unit, said response processing unit stores the address of the transmission destination of the transmission data or the address of the source of transmission of the response data in a storage unit in correlation with the name of the transmission destination; and
    said acquisition unit searches for an address corresponding to the name of the transmission destination from the storage unit and, if an address is found, acquires the found address as the address corresponding to the name of the transmission destination.

3. The apparatus according to claim 1, wherein the identification information includes an ID assigned to the transmission data.

4. The apparatus according to claim 1, wherein the address includes an IP address of Internet Protocol version 6.

5. A printing control apparatus comprising:
    the data communication apparatus set forth in claim 4; and
    a print data generating unit, configured to generate print data;
    wherein said transmission unit transmits the print data to a printer that has been connected to the network and assigned an IP address of Internet Protocol version 6.

6. The apparatus according to claim 1, wherein the acquisition unit is configured to acquire the address from a cache of the data communication apparatus first, and if the address is not found in the cache, the acquisition unit acquires the address from the DNS server.

7. The apparatus according to claim 1, wherein the transmission unit transmits the transmission data to one of the plurality of addresses together with the identification information that identifies the transmission data when the plurality of addresses are acquired from the DNS server.

8. A non-transitory computer readable storage medium on which is stored code of a computer program for causing a computer to communicate, via a network, with a network device that can be assigned a plurality of addresses per one name, said program causing the computer to perform the steps of:
    an acquisition step of acquiring an address corresponding to a name of a transmission destination;
    a transmission step of transmitting transmission data, together with identification information that identifies the transmission data, to the acquired address;
    a reception step of receiving response data having identification information corresponding to transmission data;
    a determination step of determining, based upon the identification information of the transmission data transmitted by the transmission step and the identification information of the response data, whether the received response data is a response to the transmission data transmitted by the transmission step; and
    a response processing step of discarding the response data if the determination step determines that the response data is not a response to the transmission data transmitted by the transmission step, and delivering data contained in the response data to a source requesting the data transmission if the determination step determines that the response data is a response to the transmission data transmitted by the transmission step, wherein, in the acquisition step, if an address corresponding to the name of the transmission destination is not found, the name of the transmission destination is transmitted to a DNS server and, if a plurality of addresses have been assigned to the transmission destination, the plurality of addresses are acquired collectively.

9. The non-transitory computer readable storage medium according to claim 8, further comprising a generating step of generating print data; and said transmission step transmits the generated print data to a printer that has been connected to the network and assigned an IP address of Internet Protocol version 6.

10. The non-transitory computer readable storage medium according to claim 8, wherein in the acquisition step, the address is acquired from a cache of the data communication apparatus first, and if the address is not found in the cache, the address is acquired from the DNS server.

11. The non-transitory computer readable storage medium according to claim 8, wherein in the transmission step, the transmission data is transmitted to one of the plurality of addresses together with the identification information that identifies the transmission data when the plurality of addresses are acquired from the DNS server.

12. The non-transitory computer readable storage medium according to claim 8, wherein the computer program is a printer driver program.

13. A data communication method performed by a data communication apparatus for communicating, via a network, with a network device that can be assigned a plurality of addresses per one name, said method comprising:

an acquisition step of acquiring an address corresponding to a name of a transmission destination;

a transmission step of transmitting transmission data, together with identification information that identifies the transmission data, to the acquired address;

a reception step of receiving response data having identification information corresponding to transmission data;

a determination step of determining, based upon the identification information of the transmission data transmitted by the transmission step and the identification information of the response data, whether the received response data is a response to the transmission data transmitted by the transmission step; and a response processing step of discarding the response data if the determination step determines that the response data is not a response to the transmission data transmitted by the transmission step, and delivering data contained in the response data to a source requesting the data transmission if the determination step determines that the response data is a response to the transmission data transmitted by the transmission step, wherein, in the acquisition step, if an address corresponding to the name of the transmission destination is not found, the name of the transmission destination is transmitted to a DNS server and, if a plurality of addresses have been assigned to the transmission destination, the plurality of addresses are acquired collectively.

14. The method according to claim 13, wherein in the acquisition step, the address is acquired from a cache of the data communication apparatus first, and if the address is not found in the cache, then the address is acquired from the DNS server.

15. The method according to claim 13, wherein in the transmission step, the transmission data is transmitted to one of the plurality of addresses together with the identification information that identifies the transmission data when the plurality of addresses are acquired from the DNS server.

16. A data communication apparatus capable of communicating, via a network, with a network device to which a plurality of addresses per one name has been assigned, comprising:

an acquisition unit, configured to acquire an address corresponding to a name of a transmission destination, wherein if an address corresponding to the name of the transmission destination is not found, the acquisition unit transmits the name of the transmission destination to a DNS server and acquires a plurality of addresses that have been assigned to the transmission destination;

a transmission unit, configured to transmit a transmission data, together with identification information that identifies the transmission data, to the acquired address;

a reception unit, configured to receive response data having identification information corresponding to transmission data;

a determination unit, configured to determine, based upon the identification information transmitted by the transmission unit and the identification information of the response data, whether the received response data is a response to the transmission data transmitted by the transmission unit; and a response processing unit, configured to discard the response data if the determination unit determines that the response data is not a response to the transmission data transmitted by the transmission unit, and deliver data contained in the response data to a source requesting the data transmission if the determination unit determines that the response data is a response to the transmission data transmitted by the transmission unit.

17. The apparatus according to claim 16, wherein the acquisition unit is configured to acquire the address from a cache of the data communication apparatus first, and if the address is not found in the cache, the acquisition unit acquires the address from the DNS server.

18. The apparatus according to claim 16, wherein the transmission unit transmits the transmission data to one of the plurality of addresses together with the identification information that identifies the transmission data when the plurality of addresses is acquired from the DNS server.

19. A non-transitory computer readable storage medium on which is stored code of a computer program for causing a computer to communicate, via a network, with a network device to which a plurality of addresses per one name has been assigned, the program causing the computer to perform the steps of:

acquiring an address corresponding to a name of a transmission destination, wherein if an address corresponding to the name of the transmission destination is not found, the acquisition unit transmits the name of the transmission destination to a DNS server and acquires a plurality of addresses that have been assigned to the transmission destination;

transmitting a transmission data, together with identification information that identifies the transmission data, to the acquired address;

receiving response data having identification information corresponding to transmission data;

determining, based upon the identification information of the transmission data transmitted by the transmitting step and the identification information of the response data, whether the received response data is a response to the transmission data transmitted by the transmitting step; and discarding the response data if the determining step determines that the response data is not a response to the transmission data transmitted by the transmitting step, and delivering data contained in the response data to a source requesting the data transmission if the determining step determines that the response data is a response to the transmission data transmitted by the transmitting step.

20. The non-transitory computer readable storage medium according to claim 19, wherein in the acquiring step, the address is acquired from a cache of the data communication apparatus first, and if the address is not found in the cache, the address is acquired from the DNS server.

21. The non-transitory computer readable storage medium according to claim 19, wherein in the transmitting step, the transmission data is transmitted to one of the plurality of addresses together with the identification information that identifies the transmission data when the plurality of addresses are acquired from the DNS server.

22. The non-transitory computer readable storage medium according to claim 19, wherein the computer program is a printer driver program.

23. A data communication method performed by a data communication apparatus capable of communicating, via a network, with a network device to which a plurality of addresses per one name has been assigned, the method comprising the steps of:

acquiring an address corresponding to a name of a transmission destination, wherein if an address corresponding to the name of the transmission destination is not found, the acquiring step transmits the name of the transmission destination to a DNS server and acquires a plurality of addresses that have been assigned to the transmission destination;

transmitting a transmission data, together with identification information that identifies the transmission data, to the acquired address;

receiving response data having identification information corresponding to transmission data;

determining, based upon the identification information of the transmission data transmitted by the transmitting step and the identification information of the response data, whether the received response data is a response to the transmission data transmitted by the transmitting step; and discarding the response data if the determining step determines that the response data is not a response to the transmission data transmitted by the transmitting step, and delivering data contained in the response data to a source requesting the data transmission if the determining step determines that the response data is a response to the transmission data transmitted by the transmitting step.

24. The method according to claim 23, wherein in the acquiring step, the address is acquired from a cache of the data communication apparatus first, and if the address is not found in the cache, the address is acquired from the DNS server.

25. The method according to claim 23, wherein in the transmitting step, the transmission data is transmitted to one of the plurality of addresses together with the identification information that identifies the transmission data when the plurality of addresses are acquired from the DNS server.

\* \* \* \* \*